(12) United States Patent
Lee et al.

(10) Patent No.: US 10,322,771 B2
(45) Date of Patent: Jun. 18, 2019

(54) TRANSMISSION DEVICE

(71) Applicants: Wen-Hsiu Lee, Taichung (TW); Chih-Chen Lee, Taichung (TW)

(72) Inventors: Wen-Hsiu Lee, Taichung (TW); Chih-Chen Lee, Taichung (TW)

(*) Notice: Subject to any disclaimer, the term of this patent is extended or adjusted under 35 U.S.C. 154(b) by 107 days.

(21) Appl. No.: 15/491,464

(22) Filed: Apr. 19, 2017

(65) Prior Publication Data

US 2017/0305497 A1 Oct. 26, 2017

(30) Foreign Application Priority Data

Apr. 21, 2016 (TW) .............................. 105112373 A

(51) Int. Cl.
*B62M 9/04* (2006.01)
*B62M 9/06* (2006.01)
*F16H 9/24* (2006.01)
*B62M 23/00* (2006.01)
*F16H 55/30* (2006.01)

(52) U.S. Cl.
CPC ................ *B62M 9/06* (2013.01); *B62M 9/04* (2013.01); *B62M 23/00* (2013.01); *F16H 9/24* (2013.01); *F16H 55/30* (2013.01)

(58) Field of Classification Search
CPC .. B62M 9/08; F16H 55/54; F16H 9/10; F16H 9/24; F16H 29/14
USPC ......................................................... 474/70
See application file for complete search history.

(56) References Cited

U.S. PATENT DOCUMENTS

| 524,830 | A | * | 8/1894 | Leggo, Jr. | ............... F16H 55/54 474/56 |
| 672,962 | A | * | 4/1901 | Seymour | ................... F16H 9/10 474/53 |
| 724,449 | A | * | 4/1903 | Dumaresq | ................. F16H 9/10 474/53 |
| 724,450 | A | * | 4/1903 | Dumaresq | ................. F16H 9/10 474/53 |
| 740,829 | A | * | 10/1903 | Dumaresq | ................. F16H 9/10 474/53 |
| 1,496,032 | A | * | 6/1924 | Sleeper | ............... F16H 61/6625 474/50 |
| 2,603,978 | A | * | 7/1952 | Gaisset | ................... F16H 55/54 474/56 |
| 3,850,045 | A | * | 11/1974 | Hagen | ...................... B62M 9/08 474/56 |
| 3,956,944 | A | * | 5/1976 | Tompkins | ................ B62M 9/08 474/50 |
| 3,969,948 | A | * | 7/1976 | Pipenhagen, Jr. | ....... B62M 9/08 474/50 |

(Continued)

*Primary Examiner* — Henry Y Liu
(74) *Attorney, Agent, or Firm* — Rosenberg, Klein & Lee

(57) ABSTRACT

A transmission device includes a plurality of guide pins, a first plate having multiple first guide slots, a second plate having multiple second guide slots, and a third plate having multiple third guide slots. A projection of each of the first guide slots on the third plate is deviated from a respective one of the third guide slots in a first rotational direction. A projection of each of the second guide slots is deviated from a respective one of the third guide slots in a second rotational direction which is opposite to the first rotational direction. The guide pins are respectively and slidably disposed in the second guide slots. When the first plate rotates, the guide pins slide synchronously and are equidistant from an axis.

7 Claims, 7 Drawing Sheets

(56) References Cited

U.S. PATENT DOCUMENTS

| | | | | |
|---|---|---|---|---|
| 3,995,508 A * | 12/1976 | Newell | ............... | B62M 9/08 474/50 |
| 4,129,044 A * | 12/1978 | Erickson | ............... | B62M 9/08 280/236 |
| 4,299,581 A * | 11/1981 | Korosue | ............... | B62M 9/08 474/69 |
| 4,342,559 A * | 8/1982 | Williams | ............... | F16H 9/10 474/47 |
| 4,457,739 A * | 7/1984 | Iseman | ............... | B62M 9/08 474/49 |
| 4,493,678 A * | 1/1985 | Husted | ............... | B62M 9/08 474/164 |
| 4,521,207 A * | 6/1985 | Husted | ............... | F16H 9/10 474/164 |
| 4,645,475 A * | 2/1987 | Husted | ............... | B62M 9/08 474/164 |
| 4,652,250 A * | 3/1987 | Reswick | ............... | F16H 55/54 474/52 |
| 4,655,730 A * | 4/1987 | Kupper | ............... | B62M 9/08 474/53 |
| 4,741,546 A * | 5/1988 | Reswick | ............... | F16H 55/54 280/236 |
| 4,781,663 A * | 11/1988 | Reswick | ............... | F16H 9/10 474/49 |
| 4,973,289 A * | 11/1990 | Leonard | ............... | B62M 9/08 474/136 |
| 5,035,678 A * | 7/1991 | Hageman | ............... | B62M 1/10 280/215 |
| 5,087,224 A * | 2/1992 | Stranieri | ............... | F16H 29/14 474/50 |
| 5,520,583 A * | 5/1996 | Balingit | ............... | F16H 55/54 474/50 |
| 7,077,771 B2 * | 7/2006 | Jeng | ............... | F16H 9/24 474/49 |
| 7,955,203 B2 * | 6/2011 | Siman-Tov | ............... | F16G 13/02 474/148 |
| 9,347,531 B2 * | 5/2016 | Cho | ............... | F16H 9/24 |
| 9,855,993 B2 * | 1/2018 | Rockwood | ............... | F16H 9/24 |
| 2005/0221926 A1 * | 10/2005 | Naude | ............... | F16H 9/14 474/8 |
| 2008/0058135 A1 * | 3/2008 | Naude | ............... | F16H 9/24 474/8 |

* cited by examiner

TRANSMISSION DEVICE

CROSS-REFERENCE TO RELATED APPLICATION

This application claims priority of Taiwanese Patent Application No. 105112373, filed on Apr. 21, 2016.

FIELD

The disclosure relates to a transmission device, and more particularly to a transmission device for a bicycle.

BACKGROUND

A conventional derailleur mechanism for a bicycle, as disclosed in Taiwanese Patent No. I391294 or No. I336304, includes a plurality of front sprockets adapted to be securely disposed on a crank axle of the bicycle, a plurality of rear sprockets adapted to be securely mounted to a rear hub of the bicycle, a chain trained on one of the front sprockets and one of the rear sprockets, and front and rear derailleurs respectively disposed at positions corresponding to the front and rear sprockets for derailing the chain onto different ones of the front and rear sprockets.

The conventional derailleur mechanism is applied widely to bicycles, but operation is limited by the number of the front and rear sprockets available. Therefore, there is room for improving the conventional derailleur mechanism since stepless control of the speed of the bicycle may be desirable.

SUMMARY

Therefore, an object of the disclosure is to provide a transmission device that can alleviate at least one of the drawbacks of the prior art.

According to the disclosure, the transmission device includes a first plate, a second plate, a third plate, and a plurality of guide pins.

The first plate has a first inner surface that is perpendicular to an axis, a first outer surface that is opposite to the first inner surface along the axis, a first peripheral surface that interconnects peripheries of the first inner surface and the first outer surface, and a plurality of angularly spaced-apart first guide slots that are formed in the first inner surface and that extend from a center portion of the first plate toward the first peripheral surface.

The second plate is disposed adjacent to the first plate, and has a second outer surface that is perpendicular to the axis and that faces the first inner surface of the first plate, a second inner surface that is opposite to the second outer surface along the axis, a second peripheral surface that interconnects peripheries of the second inner surface and the second outer surface, and a plurality of angularly spaced-apart second guide slots that extend through the second inner surface and the second outer surface, and that extend from a center portion of the second plate toward the second peripheral surface.

The third plate is disposed adjacent to the first plate at aside of the second plate opposite to the first plate, and has a third inner surface that is perpendicular to the axis and that faces the second inner surface of the second plate, a third outer surface that is opposite to the third inner surface along the axis, a third peripheral surface that interconnects peripheries of the third inner surface and the third outer surface, and a plurality of angularly spaced-apart third guide slots that are formed in the third inner surface and that extend radially outward from a center portion of the third plate toward the third peripheral surface. A projection of each of the first guide slots on the third inner surface of the third plate is deviated from a respective one of the third guide slots with respect to the center portion of the third plate in a first rotational direction. A projection of each of the second guide slots is deviated from a respective one of the third guide slots with respect to the center portion of the third plate in a second rotational direction which is opposite to the first rotational direction.

The guide pins are respectively and slidably disposed in the second guide slots. Each of the guide pins has a first end portion that slidably extends into a respective one of the first guide slots, and a second end portion that slidably extends into a respective one of the third guide slots, such that when the first plate rotates, the guide pins slide synchronously to change position of the second end portion of each of the guide pins in the respective one of the third guide slots. The guide pins are equidistant from the axis during rotation of the first plate.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
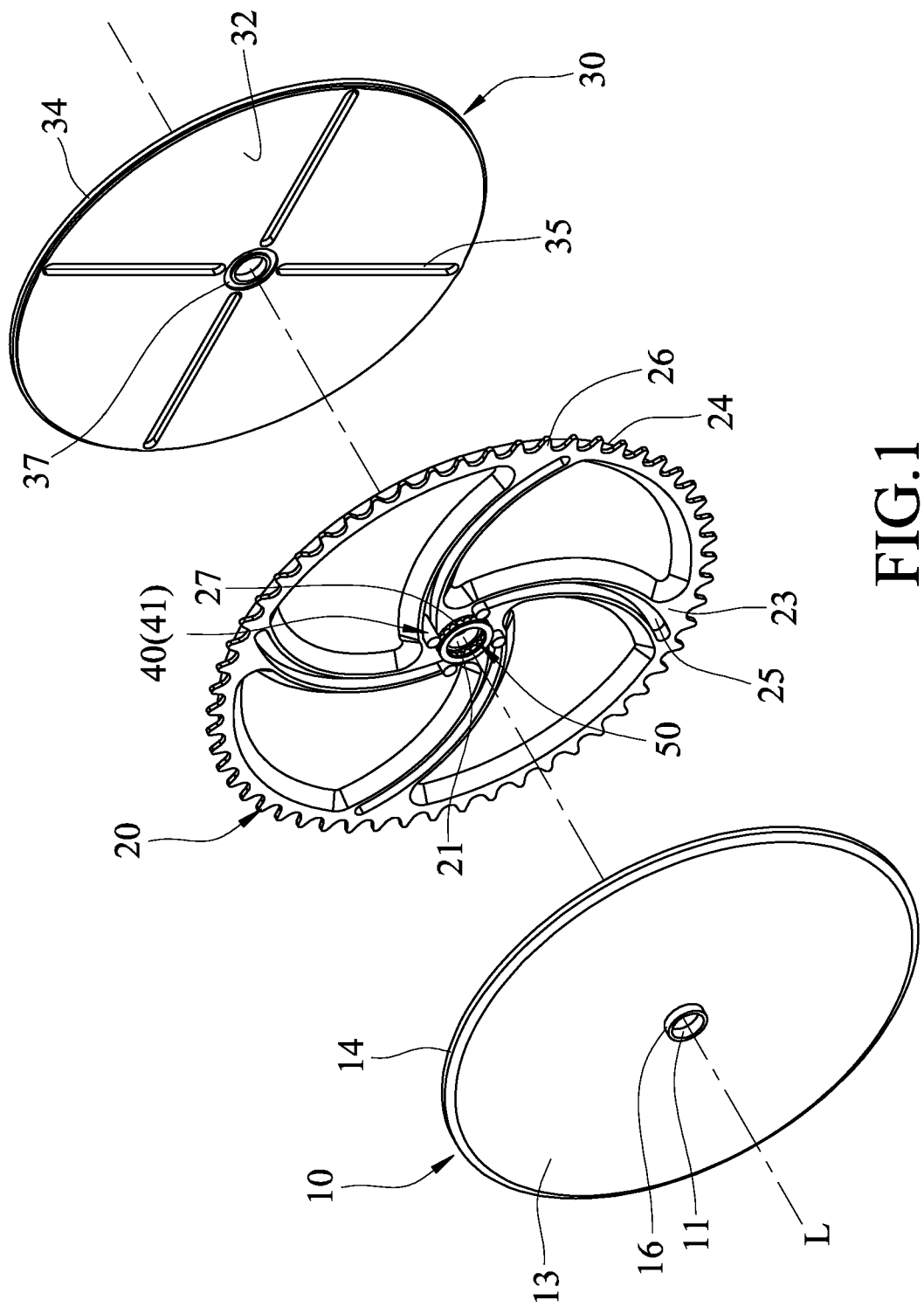
FIG. 1 is an exploded perspective view illustrating an embodiment of a transmission device according to the disclosure.
Figure 2:
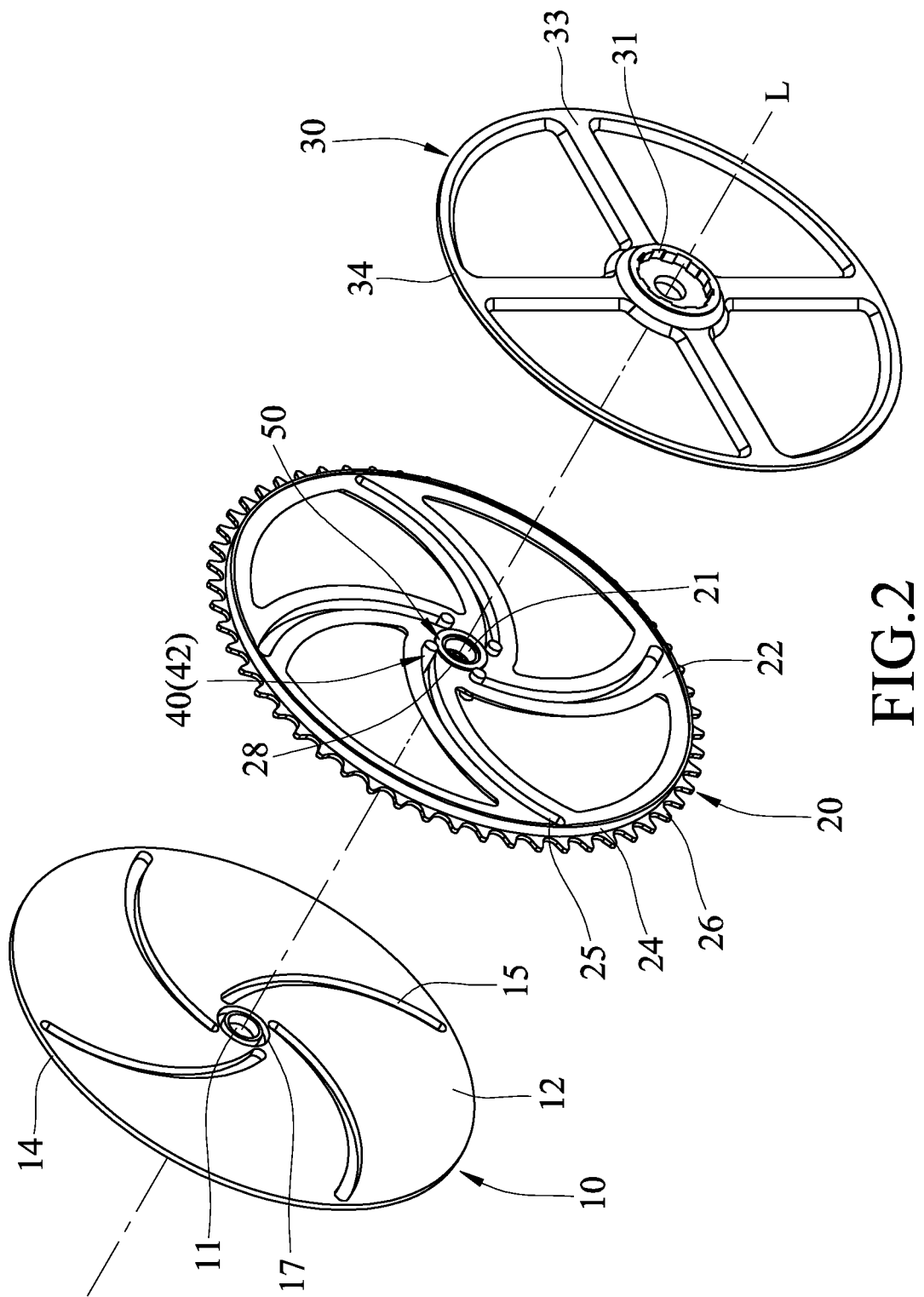
FIG. 2 is an exploded perspective view of the embodiment viewed from another angle.
Figure 3:
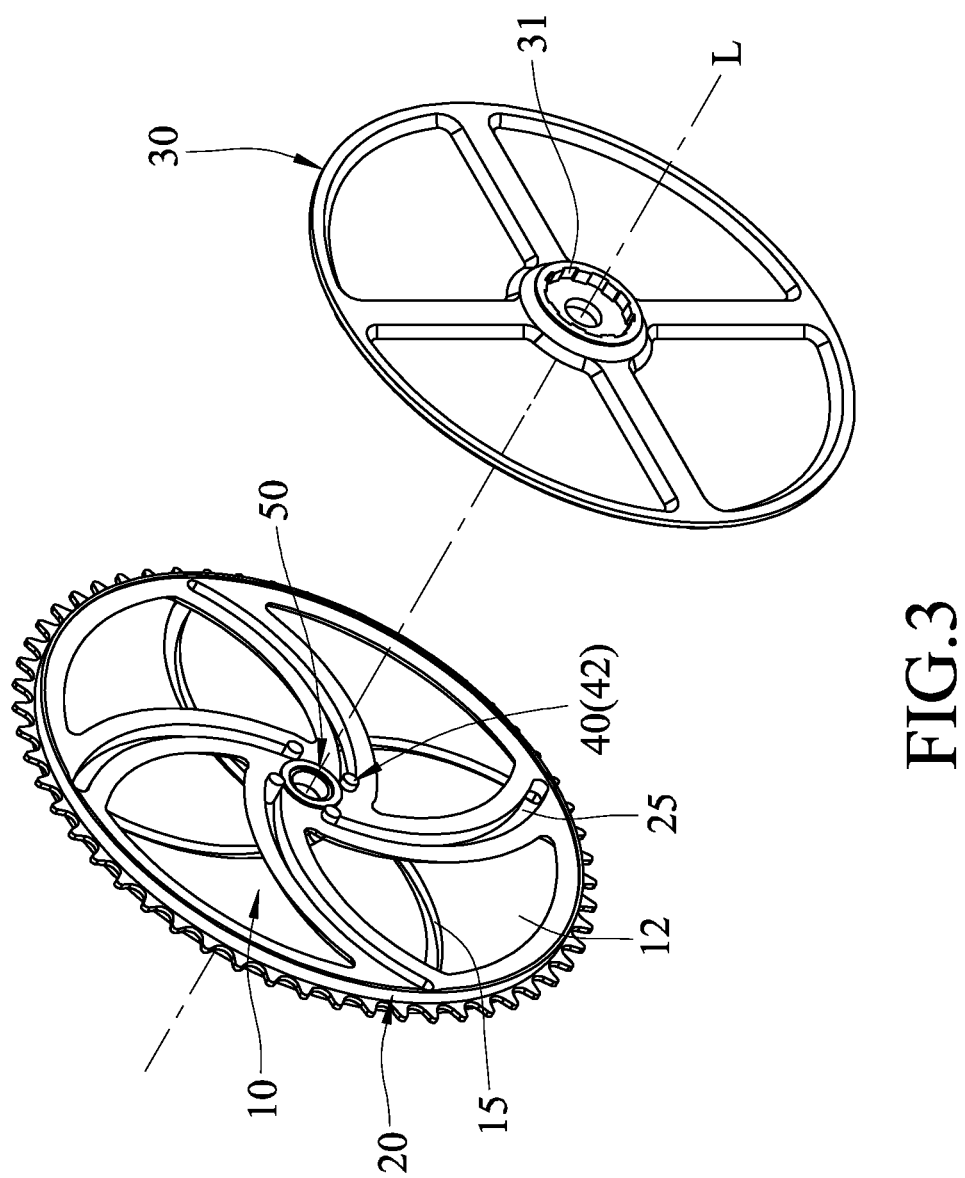
FIG. 3 is a fragmentary exploded perspective view of the embodiment.

Referring to FIGS. 1 to 5, an embodiment of a transmission device according to the disclosure is used for a bicycle. The transmission device is mounted between a bicycle frame 200 and a transmission unit 100 of the bicycle. The transmission unit 100 is mounted to a rear hub (not shown) of the bicycle, and includes a plurality of engaging teeth 101 (see FIG. 5). The transmission device includes a first plate 10, a second plate 20, a third plate 30, a plurality of guide pins 40, two bearings 50, and a drive unit 60.

The first plate 10 has a first inner surface 12, a first outer surface 13, a first peripheral surface 14, a first circular hole 11, a plurality of angularly spaced-apart first guide slots 15, a projecting member 16, and a first annular groove 17.

The first inner surface 12 is perpendicular to an axis (L). The first outer surface 13 is opposite to the first inner surface 12 along the axis (L). The first peripheral surface 14 interconnects peripheries of the first inner surface 12 and the first outer surface 13. The first circular hole 11 extends along the axis (L) for insertion of the transmission unit 100 therethrough. The first guide slots 15 are formed in the first inner surface 12, and extend from a center portion of the first plate 10 toward the first peripheral surface 14. The projecting member 16 protrudes from the first inner surface 12. The intersection between the projecting member 16 and the first outer surface 13 is circular and surrounds the first circular hole 11. The first annular groove 17 is formed in the first inner surface 12 and surrounds the axis (L). In this embodiment, the first guide slots 15 are curved, and cooperatively form a spiral vortex which swirls in a first rotational direction (I). In addition, the first guide slots 15 do not extend through the first outer surface 13.

The second plate 20 is disposed adjacent to the first plate 10, and has a second outer surface 23, a second inner surface 22, a second peripheral surface 24, a second circular hole 21, a plurality of angularly spaced-apart second guide slots 25, a plurality of teeth 26, a second outer annular groove 27, and a second inner annular groove 28.

The second outer surface 23 is perpendicular to the axis (L) and faces the first inner surface 12 of the first plate 10. The second inner surface 22 is opposite to the second outer surface 23 along the axis (L). The second peripheral surface 24 interconnects peripheries of the second inner surface 22 and the second outer surface 23. The second circular hole 21 extends along the axis (L) for insertion of the transmission unit 100 therethrough. The second guide slots 25 extend through the second inner surface 22 and the second outer surface 23, and extend from a center portion of the second plate 20 toward the second peripheral surface 24. The teeth 26 are disposed on the second peripheral surface 24, surround the axis (L), and are adapted for a chain (not shown) to be trained thereon. The second outer annular groove 27 is formed in the second outer surface 23, surrounds the axis (L), and corresponds in position to the first annular groove 17 of the first plate 10. The second inner annular groove 28 is formed in the second inner surface 22 and surrounds the axis (L). In this embodiment, the second guide slots 25 are curved, and cooperatively form a spiral vortex which swirls in a second rotational direction (II) which is opposite to the first rotational direction (I).

The third plate 30 is disposed adjacent to the first plate 10 at a side of the second plate 20 opposite to the first plate 10, is adapted to be fixedly coupled to the transmission unit 100 of the bicycle, and has a third inner surface 32, a third outer surface 33, a third peripheral surface 34, an engaging hole 31, a plurality of angularly spaced-apart third guide slots 35, and a third annular groove 37.

The third inner surface 32 is perpendicular to the axis (L) and faces the second inner surface 22 of the second plate 20. The third outer surface 33 is opposite to the third inner surface 32 along the axis (L). The third peripheral surface 34 interconnects peripheries of the third inner surface 32 and the third outer surface 33. The engaging hole 31 extends along the axis (L) and engages the engaging teeth 101 of the transmission unit 100. The third guide slots 35 are formed in the third inner surface 32 and extend radially outward from a center portion of the third plate 30 toward the third peripheral surface 34. The third annular groove 37 is formed in the third inner surface 32, surrounds the axis (L), and corresponds in position to the second inner annular groove 28 of the second plate 20.

A projection of each of the first guide slots 15 on the third inner surface 32 of the third plate 30 is deviated from a respective one of the third guide slots 35 with respect to the center portion of the third plate 30 in the first rotational direction (I). A projection of each of the second guide slots 25 is deviated from a respective one of the third guide slots 35 with respect to the center portion of the third plate 30 in the second rotational direction (II).

The guide pins 40 are respectively and slidably disposed in the second guide slots 25. Each of the guide pins 40 has a first end portion 41 that slidably extends into a respective one of the first guide slots 15, and a second end portion 42 that slidably extends into a respective one of the third guide slots 35.

The bearings 50 are disposed for permitting smooth rotation of the first and second plates 10, 20 relative to the third plate 30. In this embodiment, one of the bearings 50 is disposed in the first annular groove 17 of the first plate 10 and the second outer annular groove 27 of the second plate 20. The other one of the bearings 50 is disposed in the second inner annular groove 28 of the second plate 20 and the third annular groove 37 of the third plate 30.

The drive unit 60 includes a stator 61 that is stationary relative to the transmission unit 100, a rotor 62 that is disposed in the stator 61 and that is fixedly coupled to the first plate 10. In this embodiment, the stator 61 is securely coupled to the bicycle frame 200, the rotor 62 is fixedly disposed at an outer side of the projecting member 16 of the first plate 10.

Figure 4:
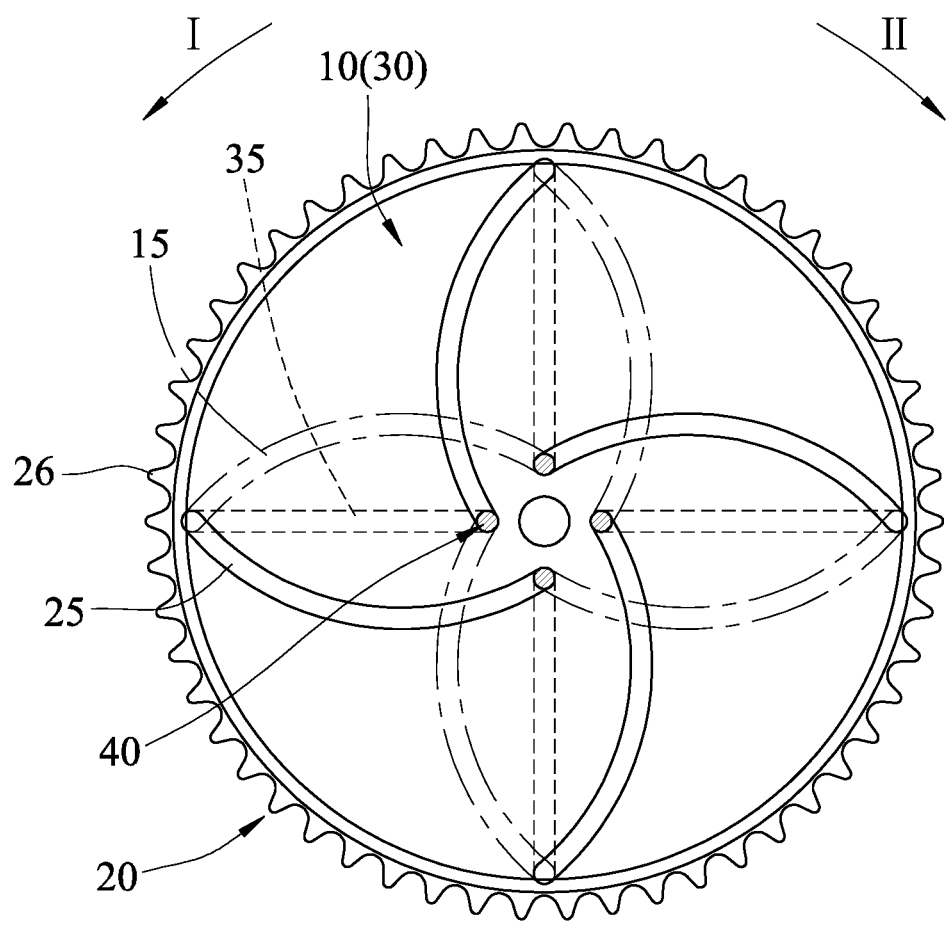
FIG. 4 is a sectional view of the embodiment, illustrating a plurality of guide pins of the embodiment at a first position.
Figure 5:
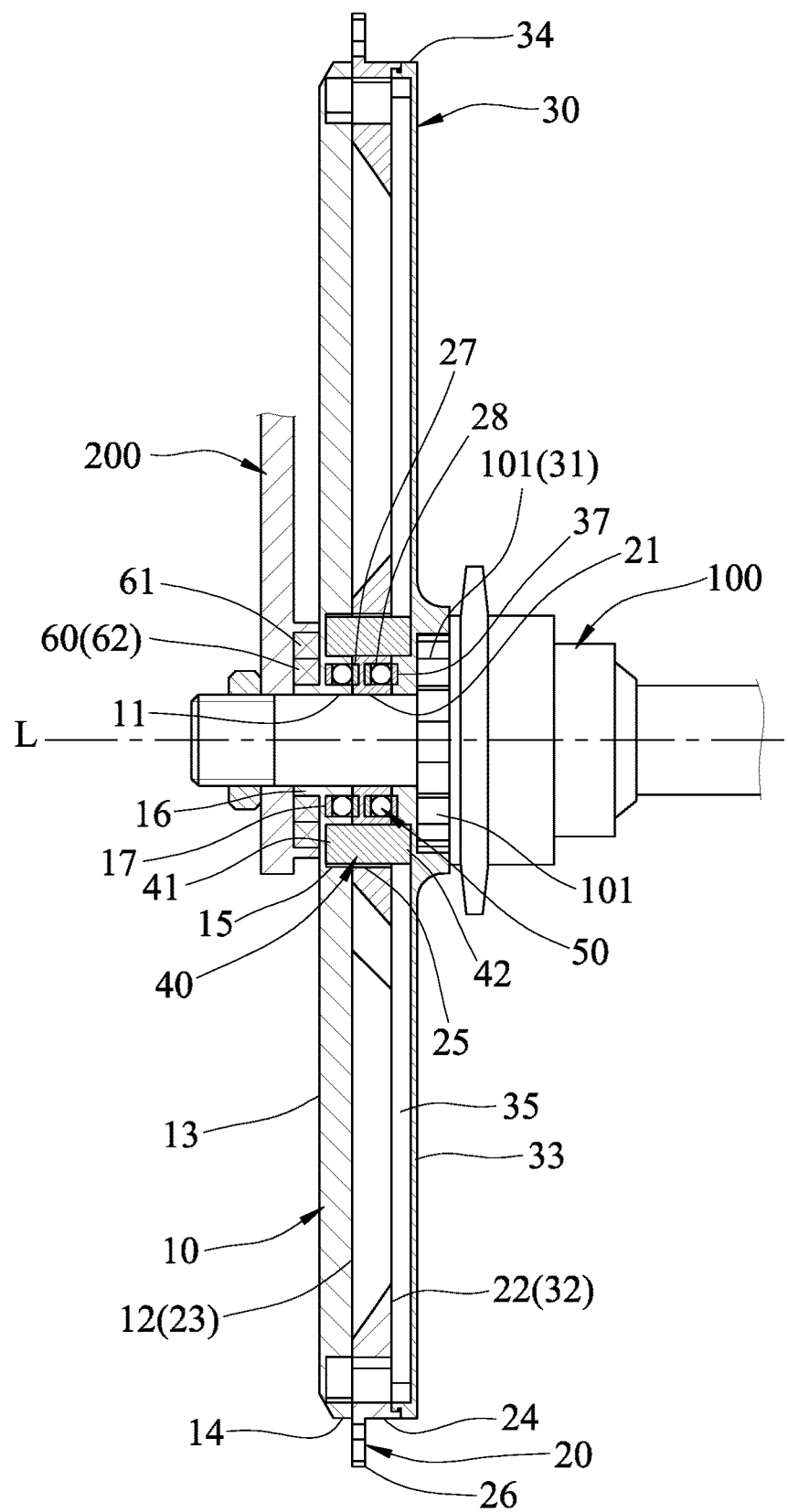
FIG. 5 is an assembled sectional side view of the embodiment, illustrating the transmission device mounted to a bicycle frame and a transmission unit of a bicycle.

Referring to FIGS. 4 and 5, when the first, second, and third plates 10, 20, 30 are assembled, the first, second, and third plates 10, 20, 30 are aligned along the axis (L) and overlap one another. The third plate 30 is non-rotatably mounted to the transmission unit 100 via engagement between the engaging hole 31 and the engaging teeth 101, and the first and second plates 10, 20 are rotatable relative to the transmission unit 100 via the bearings 50.

For describing an operation in the following paragraphs, the guide pins 40 are exemplified to be moved to a first position (see FIGS. 4 and 5), a second position (see FIG. 6), and a third position (see FIG. 7). In actual applications, the guide pins 40 can be moved to any position between the first and third positions for stepless control of the speed of the bicycle.

As shown in FIGS. 4 and 5, when the guide pins 40 are at the first position, each of the guide pins 40 is located at end portions of the respective one of the first guide slots 15, a respective one of the second guide slots 25, and the respective one of the third guide slots 35, which are adjacent to the axis (L). At this time, a distance between the axis (L) and each of the guide pins 40 is the smallest, so that when a rider (not shown) pedals to rotate the second plate 20 to drive rotation of the third plate 30 via the guide pins 40, the transmission unit 100 is driven to rotate with the lowest rotational speed.

In use, a power source (not shown) is turned on, so that an electric current passes through one of the stator 61 and the rotor 62 for generation of a magnetic force to drive rotation of the rotor 62 in the second rotational direction (II), and the first plate 10 co-rotate with the rotor 62. As the first plate 10 rotates, the guide pins 40 slide synchronously to change position of the second end portion 42 of each of the guide pins 40 in the respective one of the third guide slots 35. More specifically, the second end portions 42 of the guide pins 40 are moved in the respective third guide slots 35 toward the third peripheral surface 34. In the mean time, the second plate 20 is driven to rotate as well.

Figure 6:
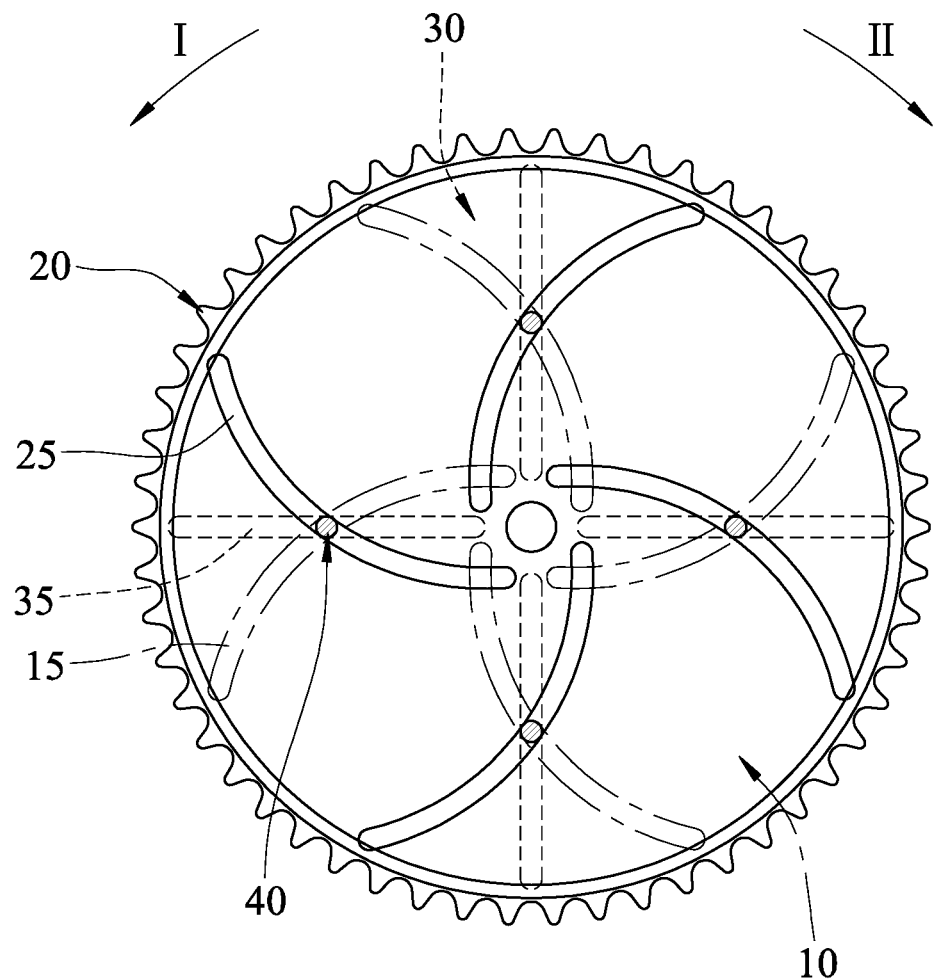
FIG. 6 is a view similar to FIG. 4, but illustrating the guide pins of the embodiment at a second position.
Figure 7:
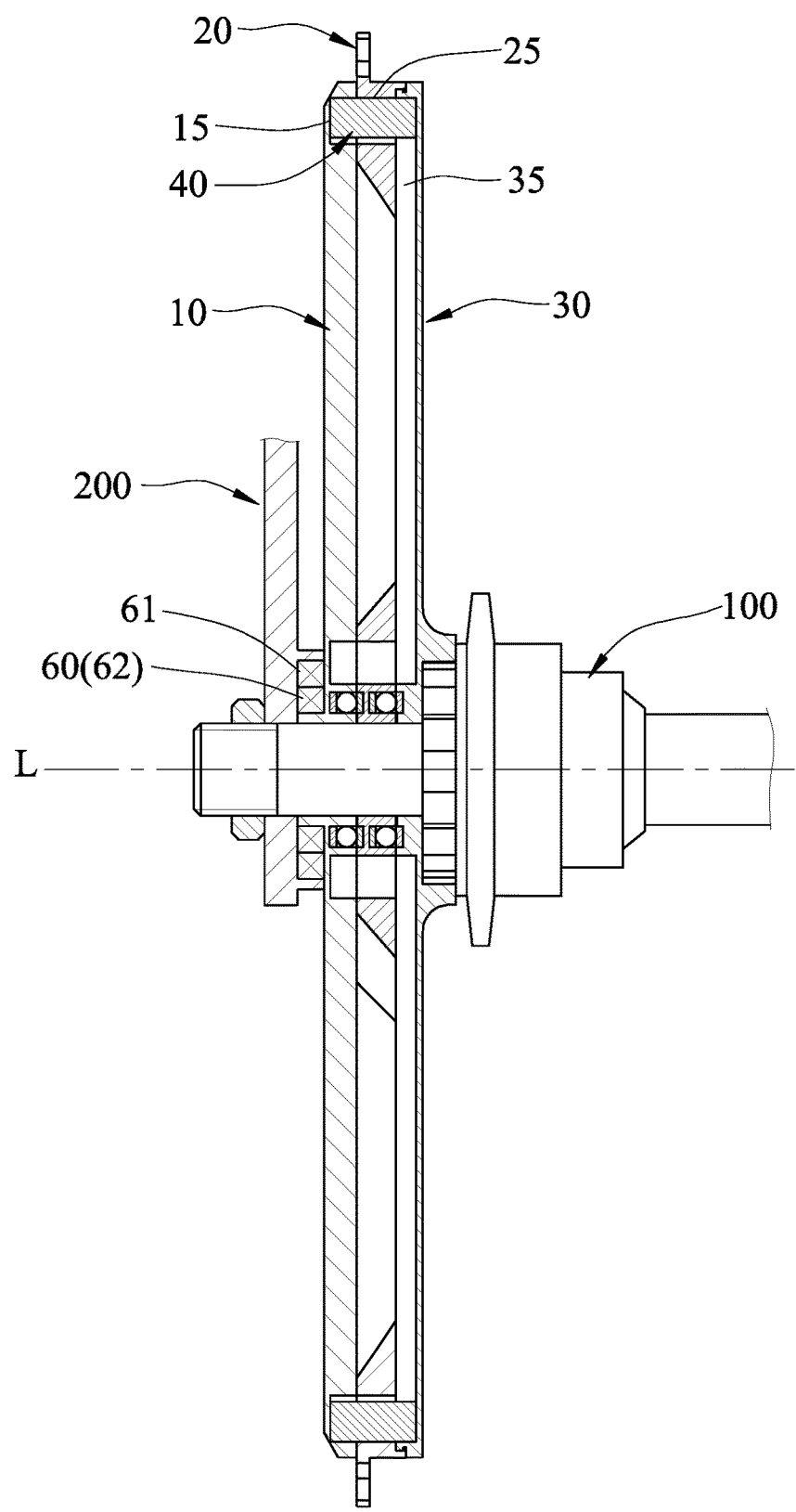
FIG. 7 is a view similar to FIG. 5, but illustrating the guide pins of the embodiment at a third position.

As illustrated in FIG. 6, the guide pins 40 are equidistant from the axis (L) during rotation of the first plate 10. When each of the guide pins 40 is located at a middle portion of the respective one of the second guide slots 25, the guide pins 40 reach the second position. At this time, a distance between the axis (L) and each of the guide pins 40 is larger compared with that at the first position. Therefore, when the rider pedals to rotate the second plate 20 to drive rotation of the third plate 30 via the guide pins 40, the transmission unit 100 is driven to rotate with a faster rotational speed.

When the rotation of the first plate 10 in the second rotational direction (II) is continued until each of the guide pins 40 reaches an end portion of the respective one of the second guide slots 25 which is adjacent to the second peripheral surface 24, the guide pins 40 are at the third position. As illustrated in FIG. 7, at this time, a distance between the axis (L) and each of the guide pins 40 is the largest, so that when the rider pedals to rotate the second plate 20 to drive rotation of the third plate 30 via the guide pins 40, the transmission unit 100 is driven to rotate with the highest rotational speed.

The user can also control the first plate 10 to rotate reversely in the first rotational direction (I). Rotation of the first plate 10 in the first rotational direction (I) moves the guide pins 40 toward the axis (L), so that the rotational speed of the transmission unit 100 is reduced.

It should be noted that the transmission device is used for a bicycle in this embodiment. The transmission device maybe applied to machines or objects other than a bicycle in actual practice.

In summary, by virtue of the guide pins 40 and the first, second, and third guide slots 15, 25, 35, rotation of the first plate 10 drives sliding movement of the guide pins 40 in the third guide slots 35 in a smooth manner, thereby achieving stepless speed changing. In addition, the transmission device of this disclosure is simple in construction and easy to assemble.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A transmission device comprising:
   a first plate having a first inner surface that is perpendicular to an axis, a first outer surface that is opposite to said first inner surface along the axis, a first peripheral surface that interconnects peripheries of said first inner surface and said first outer surface, and a plurality of angularly spaced-apart first guide slots that are formed in said first inner surface and that extend from a center portion of said first plate toward said first peripheral surface;
   a second plate disposed adjacent to said first plate, and having a second outer surface that is perpendicular to the axis and that faces said first inner surface of said first plate, a second inner surface that is opposite to said second outer surface along the axis, a second peripheral surface that interconnects peripheries of said second inner surface and said second outer surface, and a plurality of angularly spaced-apart second guide slots that extend through said second inner surface and said second outer surface, and that extend from a center portion of said second plate toward said second peripheral surface;
   a third plate disposed adjacent to said first plate at a side of said second plate opposite to said first plate, and having a third inner surface that is perpendicular to the axis and that faces said second inner surface of said second plate, a third outer surface that is opposite to said third inner surface along the axis, a third peripheral surface that interconnects peripheries of said third inner surface and said third outer surface, and a plurality of angularly spaced-apart third guide slots that are formed in said third inner surface and that extend radially outward from a center portion of said third plate toward said third peripheral surface, a projection of each of said first guide slots on said third inner surface of said third plate being deviated from a respective one of said third guide slots with respect to said center portion of said third plate in a first rotational direction, a projection of each of said second guide slots being deviated from a respective one of said third guide slots with respect to said center portion of said third plate in a second rotational direction which is opposite to the first rotational direction; and
   a plurality of guide pins respectively and slidably disposed in said second guide slots, each of said guide pins having a first end portion that slidably extends into a respective one of said first guide slots, and a second end portion that slidably extends into a respective one of said third guide slots, such that when said first plate rotates, said guide pins slide synchronously to change position of said second end portion of each of said guide pins in the respective one of said third guide slots, said guide pins being equidistant from the axis during rotation of said first plate;
   wherein said second plate further has a plurality of teeth disposed on said second peripheral surface, surrounding the axis, and adapted for a chain to be trained thereon.

2. The transmission device as claimed in claim 1, wherein:
   said first guide slots are curved, and cooperatively form a spiral vortex which swirls in the first rotational direction; and
   said second guide slots are curved, and cooperatively form a spiral vortex which swirls in the second rotational direction.

3. A transmission device comprising:
   a first plate having a first inner surface that is perpendicular to an axis, a first outer surface that is opposite to said first inner surface along the axis, a first peripheral surface that interconnects peripheries of said first inner surface and said first outer surface, and a plurality of angularly spaced-apart first guide slots that are formed in said first inner surface and that extend from a center portion of said first plate toward said first peripheral surface;
   a second plate disposed adjacent to said first plate, and having a second outer surface that is perpendicular to the axis and that faces said first inner surface of said first plate, a second inner surface that is opposite to said second outer surface along the axis, a second peripheral surface that interconnects peripheries of said second inner surface and said second outer surface, and a plurality of angularly spaced-apart second guide slots that extend through said second inner surface and said second outer surface, and that extend from a center portion of said second plate toward said second peripheral surface;

a third plate disposed adjacent to said first plate at a side of said second plate opposite to said first plate, and having a third inner surface that is perpendicular to the axis and that faces said second inner surface of said second plate, a third outer surface that is opposite to said third inner surface along the axis, a third peripheral surface that interconnects peripheries of said third inner surface and said third outer surface, and a plurality of angularly spaced-apart third guide slots that are formed in said third inner surface and that extend radially outward from a center portion of said third plate toward said third peripheral surface, a projection of each of said first guide slots on said third inner surface of said third plate being deviated from a respective one of said third guide slots with respect to said center portion of said third plate in a first rotational direction, a projection of each of said second guide slots being deviated from a respective one of said third guide slots with respect to said center portion of said third plate in a second rotational direction which is opposite to the first rotational direction; and a plurality of guide pins respectively and slidably disposed in said second guide slots, each of said guide pins having a first end portion that slidably extends into a respective one of said first guide slots, and a second end portion that slidably extends into a respective one of said third guide slots, such that when said first plate rotates, said guide pins slide synchronously to change position of said second end portion of each of said guide pins in the respective one of said third guide slots, said guide pins being equidistant from the axis during rotation of said first plate;

wherein said third plate is adapted to be fixedly coupled to a transmission unit of a bicycle;

said transmission device further comprises a drive unit including a stator that is stationary relative to the transmission unit, a rotor that is disposed in said stator and that is fixedly coupled to said first plate; and when an electric current passes through one of said stator and said rotor for generation of a magnetic force to drive rotation of said rotor, said first plate co-rotate with said rotor.

4. The transmission device as claimed in claim 3, further comprises at least one bearing disposed for permitting smooth rotation of said first and second plates relative to said third plate.

5. The transmission device as claimed in claim 4, wherein:
said first plate further has an annular groove that is formed in said first inner surface and that surrounds the axis;
said second plate further has an annular groove that is formed in said second outer surface, that surrounds the axis, and that corresponds in position to said annular groove of said first plate; and
said at least one bearing is disposed in said annular groove in said first inner surface of said first plate and said annular groove in said second outer surface of said second plate.

6. The transmission device as claimed in claim 4, wherein:
said second plate further has an annular groove that is formed in said second inner surface and that surrounds the axis;
said third plate further has an annular groove that is formed in said third inner surface, that surrounds the axis, and that corresponds in position to said annular groove of said second plate; and
said at least one bearing is disposed in said annular groove in said second inner surface of said second plate and said annular groove in said third inner surface of said third plate.

7. The transmission device as claimed in claim 3, wherein:
said first guide slots are curved, and cooperatively form a spiral vortex which swirls in the first rotational direction; and
said second guide slots are curved, and cooperatively form a spiral vortex which swirls in the second rotational direction.

* * * * *